Jan. 31, 1967

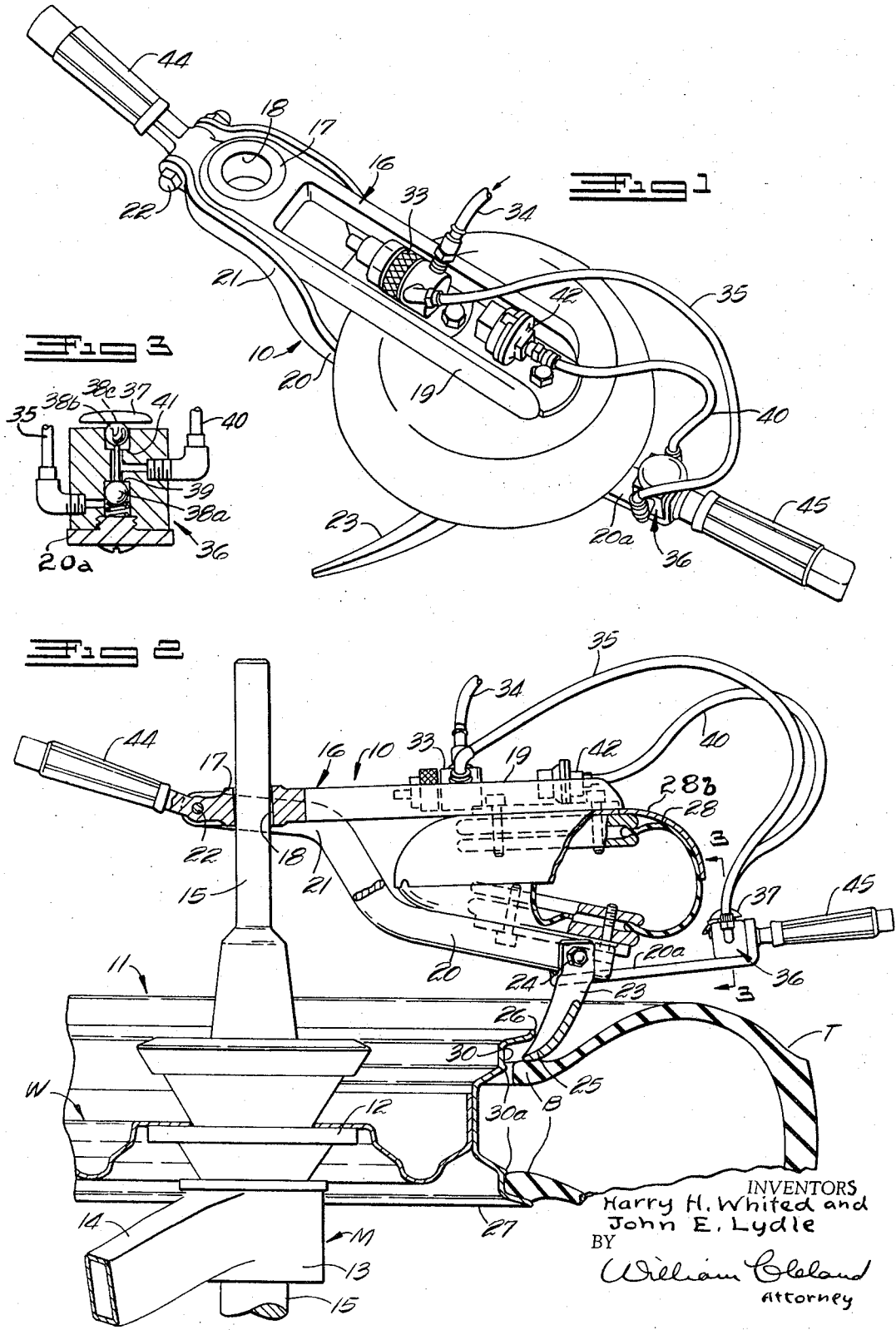

H. H. WHITED ETAL
DEVICE FOR DEMOUNTING PNEUMATIC TIRES
FROM WHEEL RIMS THEREFOR 3,301,304

Filed July 22, 1965

INVENTORS
Harry H. Whited and
John E. Lydle
BY
William Cleland
Attorney

United States Patent Office 3,301,304
Patented Jan. 31, 1967

3,301,304
DEVICE FOR DEMOUNTING PNEUMATIC TIRES FROM WHEEL RIMS THEREFOR
Harry H. Whited, Barberton, Ohio, and John E. Lydle, Box 1094, Akron, Ohio 44309; said Whited assignor to said Lydle
Filed July 22, 1965, Ser. No. 474,021
13 Claims. (Cl. 157—1.17)

This invention relates generally to tire service tools, and in particular relates to a device for removing pneumatic tires from wheel rims.

Heretofore, tire-changing machines have been provided in which various manually operable tools were used to loosen the tire beads from wheel rims. Where, however, the beads were "frozen" onto the rim seats, and/or were retained in seated position by so-called safety ridges formed on the rim seats, release of the beads by use of any kind of manually operated leverage means was difficult and generally unsatisfactory.

It is a general object of the present invention to provide a power-operated tire demounting unit, which is sufficiently compact, lightweight, and versatile to be manually transported to and from a wheel, rim, and tire assembly for power operation in positions of use for demounting the tire with a minimum of effort.

Another object of the invention is to provide a self-contained, power-operated, tire-demounting unit which can be used in small or confined working space where compressed air is available, whether the wheel assembly is on the vehicle, on a tire-working machine, or on the ground, which accordingly makes the power-operated unit available to small auto garages, service stations, and the like, where larger power operated devices are not ordinarily available or feasible.

Other objects of the invention will be manifest from the following brief description and the accompanying drawings.

Of the accompanying drawings:

FIGURE 1 is a perspective view of a tire-demounting device embodying the features of the invention, and predominantly showing the top of the device.

FIGURE 2 is a side elevation of the device shown in FIGURE 1, partly broken away and in cross-section, and mounted in a position of use for demounting a tire on a wheel clamped on a tire-changing machine.

FIGURE 3 is an enlarged cross-section through a control valve, substantially as viewed on line 3—3 of FIGURE 2.

Figure 4:
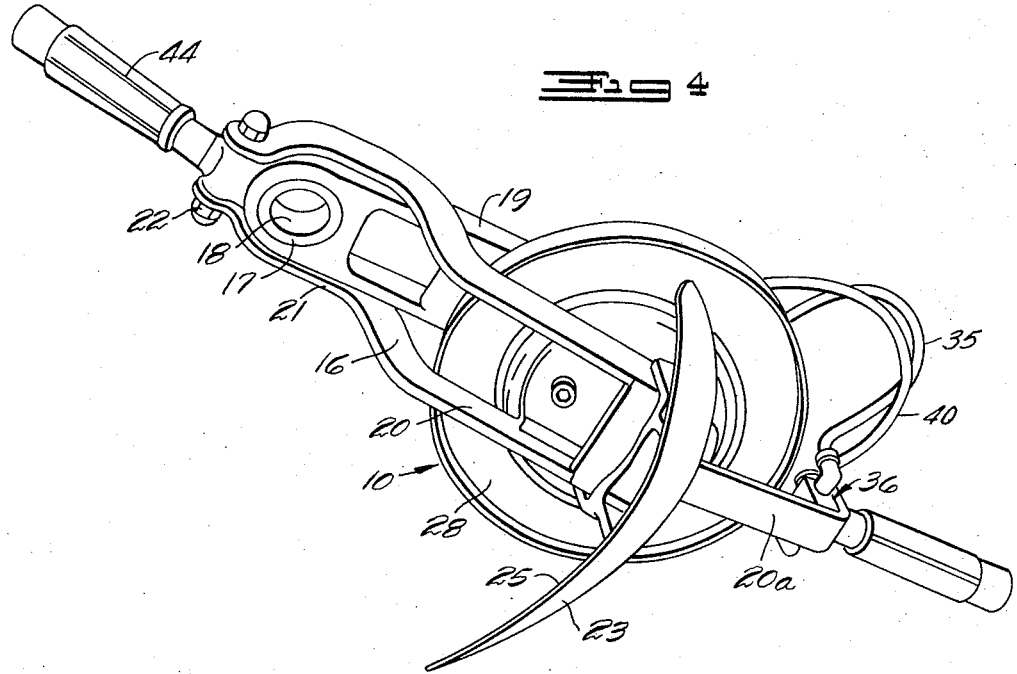
FIGURE 4 is a perspective view of the tire-demounting device shown in FIGURE 1 but predominantly showing the underside of the device.

Referring particularly to FIGURES 1 to 3, there is illustrated a portable, power-operated, tire-demounting unit 10, particularly for use with a wheel, rim, and tire assembly 11 mounted on a tire-changing machine of a type shown in Patent 3,050,096, dated August 21, 1962. That is, the wheel W is clamped on a plate 12 which is rotatable about one axis of a hub 13 on the end of an arm 14, which in turn is rotatable on an upright (not shown), about a horizontal axis. Accordingly, the assembly 11 is rotatable about a plurality of axes, particularly to include inverted horizontal positions of the assembly in which one or other of oppositely disposed posts or stem 15, 15 is presented upwardly (see, for example, FIGURE 2 of the drawings herein).

The unit 10 may include a rigid member 16, including a hub 17 having a bore 18 therethrough for fairly snug upward sliding reception of one upwardly presented stem 15. Member 16 has a rigid extension or element 19, below which is a second rigid element 20 having an upwardly offset, bifurcated portion 21, which is pivoted at 22 to the hub portion 17 of member 19 to be at the opposite side of the bore 18 from element 19. A fishtail or scoop-shaped tire-demounting tool 23 is pivoted at 24 to the movable lowermost element 20 to depend therefrom, for engagement of an arcuate lower edge 25 with the tire bead B at points closely adjacent the peripheral edge 26 of the respective rim flange 27, relatively as shown in FIGURE 2.

For urging the element 20 downwardly of the relatively fixedly held element 19 a circular, inflatable bag or diaphragm 28, of rubber or fabric-reinforced elastic material, may have top and bottom sides thereof secured, by suitable means (not shown), to the respective elements (see FIGURE 2). By inflating the bag 28 to expand the same, the elements 19 and 20 are urged relatively apart, initially to tilt the member 16 (and element 23) very slightly upwardly into a tight wedgingly anchoring grip with the upwardly presented post 15, and then to urge element 20 downwardly. This applies strong pressure of the tool 23 against the tire sidewall, close to the respective bead portion thereof, quickly to release the respective bead B of tire T from the bead seat 30 of the wheel. A piston pump may, for example, be used instead of bag 28.

The inflation means for the bag 28 may include a known type of pressure regulating valve 33 mounted on element 19, and connected at one side to a conduit 34 from a source of pressurized air (not shown), and at the other side through a conduit 35 which connects with an inlet side of two-way control valve 36 mounted on an outward extension 20a of the movable lower element 20. Depression of a spring-pressed button 37 on valve 36 operates an oppositely spring-pressed ball and pin assembly in the valve simultaneously, through movement of one ball 38a, to open a normally closed valve port 39 for passage of pressurized air from supply conduit 35 through inflation conduit 40, and to close an air exhaust outlet valve port 41 (see FIGURE 3). Inflation conduit 40 connects with interior of bag 28, through a quick-exhausting valve 42, which is also affixed on the relatively fixed element 19.

Inflation of the bag 28, against the backing of a dome-shaped shield 28b, urges the movable element 20 and tool 23 downwardly to accomplish release of the respective tire bead B from its bead seat 30, as shown in FIGURE 2. As long as the button 37 is held depressed the bag 28 remains inflated but upon release of the button the aforesaid pin-and-ball assembly returns to original condition in which balls 38a and 38b are in closed and open positions, respectively, simultaneously to stop inflation of the bag and to exhaust air from the same through the conduit 40 past the ball 38b and through a slot 38c. In other words, the bag 28 is inflated by yieldingly depressing valve button 37, and rapidly deflated by releasing said button.

For manually lifting, transporting, and manipulating the unit 10 in use, a handle 44 may be affixed on a hub portion 17 of member 16 to extend inwardly of the pivot 22 with relation to the wheel assembly 11, and a handle 45 is provided on extension 20a to extend in the opposite direction, or outwardly of the wheel assembly.

In use of the unit 10, illustrated in FIGURES 1, 2 and 4, it is easily carried or transported by means of handles 44 and 45 to a tire-changing machine of the general type shown and described in said Patent 3,050,096, on which a tire and wheel assembly 11 has been affixed, as previously described, to have post 15, 15 extending in axially opposed directions. The demounting unit 10 is readily positioned slidably to receive the upwardly extending post 15 through the bore 18 in hub 17 of the member 16, as best shown in FIGURE 2. In this position the demounting unit 10 is easily adjustable on the post 15 so that the curved edge 25 of tool 23 adjusts to engagement with the tire bead B, in close proximity to the peripheral edge 26 of the rim flange. By depressing control valve button 37 the bag 28 is inflated as previously described, first to wedgingly lock the member 16 against upward sliding movement on the post 15, and then to urge element 20 downwardly so that the tool 23 will urge the tire bead B past the usual peripheral safety ridge 30a on the rim seat 30, after which the valve is again operated to deflate the bag 28. By means of one or both of handles 44 and 45, as necessary, the operator may repeatedly adjust the unit 10, and/or the wheel assembly with respect to the machine hub 13 progressively to reposition the unit 10 around the wheel assembly, as necessary to release the entire tire bead B from the rim seat thereof.

When this is accomplished and after first removing the tire-demounting unit 10 from the upper post 15, the arm 14 of machine M is rotatable about a horizontal axis to invert the wheel and rim assembly. Thus, the lower post 15, as viewed in FIGURE 2, will then be presented in an uppermost position, and the entire operation may be repeated, as described above, for releasing the other tire bead B from its rim seat.

Figure 5:
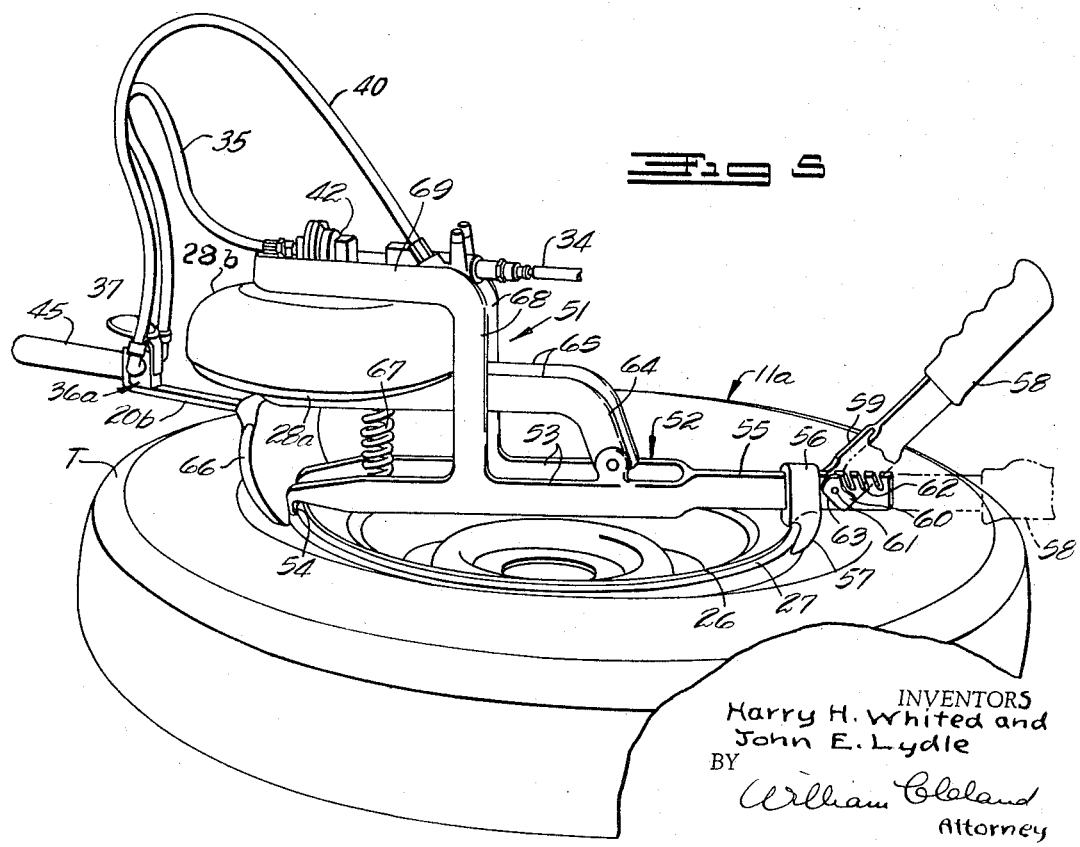
FIGURE 5 is a perspective view, partly broken away, of a modified form of a tire-demounting device in association with a wheel, rim, and tire assembly supported flatwise on a floor.

Referring now to FIGURE 5, there is illustrated a modified form of portable tire-demounting unit 51 which is particularly adapted for use on a tire and wheel assembly 11a supported flatwise on the floor, for example. That is, no tire changing machine or fulcruming or anchoring posts are required.

Demounting unit 51 may include a rigid member 52 having bifurcations 53, 52 terminating in hooked ends 54, 54 adapted to hook over the peripheral edge 26 of rim flange 27, and to extend diametrically across said flange so that an integral rigid extension bar 55 overlies and extends outwardly of said peripheral edge 26. A collar 56 slidably received on the bar 55 has a hook 57 adapted likewise for hooked adjustment with the peripheral edge 26 at a point diametrically opposite to the hooked ends 54. A handled cam lever 58 has a forked portion 59 between the forks 60, 60 of which a pin 61 extends for downward engagement into a selected one of a plurality of spaced cam slots 62, 62 opening at the top edge of the bar 55 when the lever 58 is held at an upward inclination. By urging the pin 61 to the lower end of the selected slot 62 the lever may be swung downward, as shown in chain-dotted lines, to engage cam-shaped ends 63, 63 with the collar 56, thereby to apply clamping engagement of the opposite hooked portions 54 and 57 with the rim flange, and fixedly to attach member 52 to the rim flange 27.

Pivoted to the bifurcations 53, to be centrally of the rim 27, may be an arm 64 having a U-shaped element 65 to which is secured a downwardly depending fishtail-shaped tool 66, engageable with the tire T, as before, or as otherwise shown in FIGURE 5. The element 65 normally may be yieldingly supported above member 53 by compression spring means 67.

Integral uprights 68, 68 on the bifurcations 53 may have an integral angular extension 69 constituting a relatively fixed element corresponding to fixed element 19 of FIGURE 2, which overlies the pivoted element 65 corresponding to element 20 in spaced relation thereto. An inflatable bag 28a, corresponding to the bag 28 in FIGURES 1 to 4, and a two-way control valve 36a is mounted on a rigid outward extension 20b from the tool 66. As bags 28 and 28a are operated in the same manner to loosen the bead B from the rim seat, like parts in the pneumatic actuating mechanism are otherwise given like numerals unless otherwise noted. In any event, the unit 51 is operable as described before in connection with FIGURES 1 to 4, except that the tire may be removed from the wheel without use of any other equipment. Likewise the unit 51 is operable to demount a tire on a wheel while the same is jacked up on a vehicle.

Other modifications of the invention may be resorted to without departing from the spirit thereof or the scope of the appended claims.

What is claimed is:

1. A tire-changing device as for changing a tire assembled on a wheel rim having tire bead seats and bead-retaining flanges, and wherein the tire and rim assembly is attachable on a support of the type including a rigid stem for extension axially of the wheel rim, comprising: a rigid member having means thereon for fixedly supporting the same with respect to a peripheral edge of said rim flange; relatively fixed and movable elements carried by said member to extend in axially spaced relation outwardly of said rim flange; a tool carried by said movable element for engagement with a portion of the tire adjacent said peripheral edge; and power means mounted between said elements for relatively moving the same to urge said tool against said portion of the tire to release the corresponding tire bead from its rim seat; said rigid member including a hub provided with a bore therethrough for sliding reception of said stem, whereby any tilting of said rigid member in axial direction will accomplish a wedging grip of hub portion on the stem for affixing said rigid member thereon in opposition to bead-releasing engagement of said tool against said portion of the tire.

2. A device as in claim 1, said relatively fixed and movable elements having gripping means thereon to facilitate manual transportation of the device as a unit and manipulation of the same in use.

3. A device as in claim 1, wherein hand-grip means is provided on said rigid member for lifting and manipulating the device in use.

4. A device as in claim 1, wherein said rigid member includes a cross-bar thereon; said cross-bar having gripping means for releasably affixing the same diametrically across the respective bead-retaining flange to have said tool in a selected position for said engagement thereof with said portion of the tire.

5. A device as in claim 1, wherein said rigid member includes a cross-bar thereon; said cross-bar having gripping means thereon for releasably rigidly affixing the same diametrically across said bead-retaining flange to have said tool in a selected position for said engagement thereof with the tire; said gripping means including a first hook means on one end of said cross-bar for hooked engagement with the rim flange in said position of engagement, a second hook means shiftably mounted on said cross-bar, and a lever pivoted on the cross-bar, said lever and the second hook means having cam portions operable by pivoting said lever to draw the first and second hook means together and thereby clamp the cross-bar to a said selected position on said respective rim flange.

6. A device as in claim 1, wherein said rigid member includes a cross-bar thereon; said cross-bar having gripping means thereon for releasably rigidly affixing the same diametrically across the respective bead-retaining flange to have said tool in a selected position for said engagement thereof with said portion of the tire; said gripping means including a first hook means on one end of said cross-bar for hooked engagement with the rim flange in said position of engagement, a second hook means shiftably mounted on said cross-bar, and a lever pivoted on the cross-bar, said lever and the second hook means having cam portions operable by pivoting said lever to draw the first and second hook means together and thereby clamp the cross-bar to a said selected position on said respective rim flange; hand grip means being provided on said element to facilitate manual transportation of the device as a unit and manipulating the same in use.

7. A device as in claim 1, including resilient means tending yieldingly to urge said member and element together.

8. A device as in claim 1, wherein said rigid member includes a cross-bar thereon; said cross-bar having gripping means for releasably affixing the same diametrically across the respective bead-retaining flange to have said tool in a selected position for said engagement thereof with said portion of the tire; resilient means being provided between said cross-bar and said relatively movable element, tending yieldingly to urge said member and element together.

9. A tire-changing device as for changing a tire assembled on a wheel rim having tire bead seats and bead-retaining flanges, comprising: a rigid member having means thereon for rigidly affixing the same with respect to a said bead-retaining flange with a rigidly affixed portion of the member axially outwardly spaced from a peripheral edge portion of the flange; a rigid element movably connected to said member for movement of a freely extending portion of the element axially inwardly with respect to said rigidly affixed portion of said member and corresponding movement toward and from said peripheral edge portion of said one bead-retaining flange; a tool carried by said freely extending portion for axially inward pressure engagement with a portion of the tire adjacent said peripheral edge portion; and power-operated reciprocable means connected between said member portion and said freely extending portion for reciprocably shifting said rigid element and thereby to urge said tool toward and from said pressure engagement with said portion of the tire for releasing the corresponding tire bead from its rim seat.

10. A device as in claim 9, said power means including an expansible body affixed between said rigidly affixed portion and said freely extending portion, and a source of pressure fluid medium for expanding and contracting said body.

11. A device as in claim 9, said reciprocable means including inflatable casing means mounted between said rigidly affixed portion and said freely extending portion; a conduit connecting said casing to a source of pressure fluid, and a manually operable valving means to control the supply of said pressure fluid to said casing.

12. A device as in claim 11, said valving means including a two-way valve having a spring-pressed part manually yieldingly movable to supply pressure fluid to inflate the casing means and releasable to deflate the casing.

13. A device as in claim 12, said pressure fluid being pressurized air supplied in said two-way valve through a pressure regulator, and the deflation side of said two-way valve being connected to said casing through a pressure relief valve.

References Cited by the Examiner
UNITED STATES PATENTS

| | | | |
|---|---|---|---|
| 1,475,519 | 11/1923 | Snider | 157—1.17 |
| 2,621,715 | 12/1952 | Lien et al. | 157—1.26 |
| 2,801,684 | 8/1957 | Salsbury | 157—1.17 |
| 2,920,688 | 1/1960 | Lewis | 157—1.17 |

GRANVILLE Y. CUSTER, Jr., *Primary Examiner.*

UNITED STATES PATENT OFFICE
CERTIFICATE OF CORRECTION

Patent No. 3,301,304　　　　Dated January 31, 1967

Inventor(s) Harry H. Whited, et al

It is certified that error appears in the above-identified patent and that said Letters Patent are hereby corrected as shown below:

In the heading to the printed specification, lines 5 and 6, "said Whited assignor to said Lydle" should read -- assigno by direct and mesne assignments, to Cooper Industries, Inc., Mount Vernon, Ohio, a corporation of Ohio --.

Signed and sealed this 10th day of October 1972.

(SEAL)
Attest:

EDWARD M. FLETCHER, JR.　　　　ROBERT GOTTSCHALK
Attesting Officer　　　　　　　　Commissioner of Patents